(12) United States Patent
Gilde et al.

(10) Patent No.: US 9,383,173 B2
(45) Date of Patent: Jul. 5, 2016

(54) TRANSPARENT ARMOR CONSTRUCTION

(71) Applicant: U.S. Army Research Laboratory ATTN: RDRL-LOC-I, Adelphi, MD (US)

(72) Inventors: Gary A. Gilde, North East, MD (US); Parimal J. Patel, Joppa, MD (US); Terrence M. Taylor, Aberdeen, MD (US); David M. Spagnuolo, Newark, DE (US); Constantine Fountzoulas, Wilmington, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 185 days.

(21) Appl. No.: 13/947,690

(22) Filed: Jul. 22, 2013

(65) Prior Publication Data

US 2015/0024165 A1 Jan. 22, 2015

(51) Int. Cl.
*B32B 3/08* (2006.01)
*B32B 3/24* (2006.01)
(Continued)

(52) U.S. Cl.
CPC .............. *F41H 5/0407* (2013.01); *B32B 3/266* (2013.01); *B32B 7/02* (2013.01); *B32B 17/101* (2013.01); *B32B 17/10366* (2013.01); *B32B 3/08* (2013.01); *B32B 7/12* (2013.01); *B32B 17/064* (2013.01); *B32B 17/10* (2013.01); *B32B 17/1077* (2013.01); *B32B 17/10119* (2013.01); *B32B 17/10293* (2013.01); *B32B 17/10752* (2013.01); *B32B 17/10761* (2013.01); *B32B 2307/30* (2013.01); *B32B 2307/412* (2013.01); *B32B 2307/50* (2013.01); *B32B 2307/558* (2013.01); *B32B 2605/00* (2013.01); *B32B 2605/006* (2013.01); *Y10S 428/911* (2013.01);
(Continued)

(58) Field of Classification Search
CPC ...................................................... F41H 5/0407
See application file for complete search history.

(56) References Cited

U.S. PATENT DOCUMENTS 2,145,930 A * 2/1939 Herron .............. B32B 17/10055
156/107
2,537,804 A * 1/1951 Watkins ................. B29C 39/10
109/76
(Continued)

FOREIGN PATENT DOCUMENTS

DE 1905619 A * 8/1970
EP 531913 A1 * 3/1993
(Continued)

OTHER PUBLICATIONS

English Translation of JP 56069247 A, Jun. 1981.*
(Continued)

*Primary Examiner* — Jeff Vonch
(74) *Attorney, Agent, or Firm* — Christos S. Kyriakou

(57) ABSTRACT

A transparent armor construction having a laminate structure with at least two layers. The layers are constructed of two different materials selected from the group of glass, ceramic, resin, polymeric material, and plastic and in which the at least two layers include different coefficients of thermal expansion. The layers are bonded together and a planar frame having an open central section and an outer border is then bonded to the laminate structure. The material for the planar frame is selected so that it has a coefficient of thermal expansion less than the coefficient of thermal expansion of the laminate layer to which it is bonded.

21 Claims, 1 Drawing Sheet

(51) Int. Cl.
*F41H 5/04* (2006.01)
*B32B 7/02* (2006.01)
*B32B 7/12* (2006.01)
*B32B 18/00* (2006.01)
*B32B 27/00* (2006.01)
*B32B 17/06* (2006.01)
*B32B 17/10* (2006.01)
*B32B 3/26* (2006.01)

(52) U.S. Cl.
CPC .......... *Y10T 428/162* (2015.01); *Y10T 428/166* (2015.01); *Y10T 428/24298* (2015.01); *Y10T 428/24322* (2015.01); *Y10T 428/24331* (2015.01); *Y10T 428/24752* (2015.01); *Y10T 428/24777* (2015.01); *Y10T 428/24942* (2015.01); *Y10T 428/31522* (2015.04); *Y10T 428/31601* (2015.04)

(56) References Cited

U.S. PATENT DOCUMENTS

| | | | |
|---|---|---|---|
| 2,758,042 A * | 8/1956 | Raymond | B32B 17/10036 156/106 |
| 2,991,207 A * | 7/1961 | Miller | B32B 17/10036 156/99 |
| 2,991,209 A * | 7/1961 | Worrall | B32B 17/10 156/99 |
| 3,009,845 A * | 11/1961 | Wiser | B32B 17/10036 428/192 |
| 3,081,205 A * | 3/1963 | Shorr | B32B 17/10036 428/38 |
| 3,261,739 A * | 7/1966 | Porter | B32B 17/10036 219/522 |
| 3,356,833 A * | 12/1967 | Orcutt | 219/522 |
| 3,493,458 A * | 2/1970 | Santangelo | B29C 45/14336 156/227 |
| 3,498,871 A * | 3/1970 | Hand | B32B 17/10045 156/106 |
| 3,508,987 A * | 4/1970 | Folk | B32B 17/10 156/99 |
| 3,616,122 A * | 10/1971 | Orcutt | B32B 17/10036 156/106 |
| 3,624,238 A * | 11/1971 | McKenzie | B32B 17/10 351/159.57 |
| 3,671,370 A * | 6/1972 | Littell, Jr. | B32B 17/10045 109/49.5 |
| 3,764,445 A * | 10/1973 | Olson | B32B 17/10018 428/188 |
| 3,864,204 A * | 2/1975 | Shorr | B32B 17/10045 428/213 |
| 3,930,452 A * | 1/1976 | Van Laethem | B32B 17/10045 109/49.5 |
| 3,974,359 A * | 8/1976 | Orcutt | B32B 17/10036 219/203 |
| 3,985,429 A * | 10/1976 | Fleischer | G02B 5/08 359/848 |
| 4,075,381 A * | 2/1978 | Furukawa | B32B 17/10036 156/102 |
| 4,277,294 A * | 7/1981 | Orcutt | B32B 17/10045 156/102 |
| 4,321,777 A * | 3/1982 | Sauret | B32B 17/10 428/412 |
| 4,719,151 A * | 1/1988 | Chyung | C03C 14/002 428/427 |
| 4,817,347 A * | 4/1989 | Hand | B32B 17/10 219/203 |
| 4,861,666 A * | 8/1989 | LeGrand | B32B 17/10 428/215 |
| 5,132,162 A * | 7/1992 | De Paoli | B32B 17/10036 296/84.1 |
| 5,185,979 A * | 2/1993 | Azzimonti | E04B 2/967 52/235 |
| 5,326,606 A * | 7/1994 | Labock | B32B 27/06 428/214 |
| 5,885,714 A * | 3/1999 | Demeester | B32B 17/10045 428/192 |
| 6,280,826 B1 * | 8/2001 | Woll | B32B 17/10045 109/49.5 |
| 6,334,382 B2 * | 1/2002 | Gourio | 428/911 |
| 6,569,787 B1 * | 5/2003 | Snelling | B32B 17/10293 2/2.5 |
| 6,708,595 B1 * | 3/2004 | Chaussade et al. | 89/36.02 |
| 7,892,616 B2 * | 2/2011 | Huchet | B60J 1/00 428/38 |
| 7,968,170 B2 * | 6/2011 | Albers | B29C 43/18 456/242 |
| 8,088,472 B2 * | 1/2012 | Mannheim Astete | B32B 17/10045 428/212 |
| 2004/0187437 A1 * | 9/2004 | Stark | B32B 7/04 52/786.12 |
| 2006/0131928 A1 * | 6/2006 | Onizawa | C08J 5/12 296/146.15 |
| 2007/0040416 A1 * | 2/2007 | Bordeaux | B29C 45/14434 296/216.09 |
| 2009/0304970 A1 * | 12/2009 | Imaizumi | B29C 45/062 428/38 |
| 2009/0324935 A1 * | 12/2009 | Bennison | B32B 17/10045 428/334 |
| 2010/0132540 A1 * | 6/2010 | Mandelartz | B32B 17/10045 89/36.02 |
| 2012/0198989 A1 * | 8/2012 | Varshneya | B32B 17/10761 89/36.02 |
| 2012/0219749 A1 * | 8/2012 | Leighton | B32B 18/00 428/76 |

FOREIGN PATENT DOCUMENTS

| | | | | |
|---|---|---|---|---|
| JP | 56069247 A | * | 6/1981 | ............. C03C 27/12 |
| JP | 58150821 A | * | 9/1983 | |
| KR | 2006104072 A | * | 9/2006 | |
| WO | WO 2009042877 A2 | * | 4/2009 | ........ B32B 17/10045 |

OTHER PUBLICATIONS

English Abstract for JP 58150821 A, Sep. 1983.*

* cited by examiner

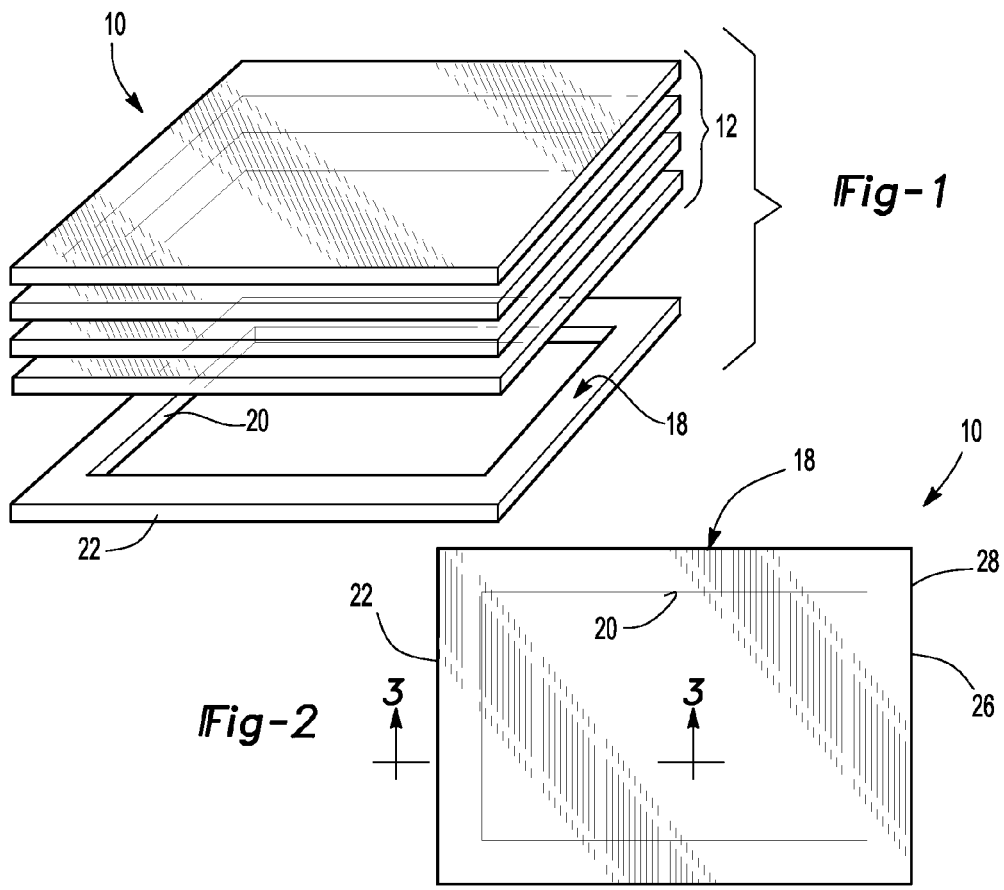
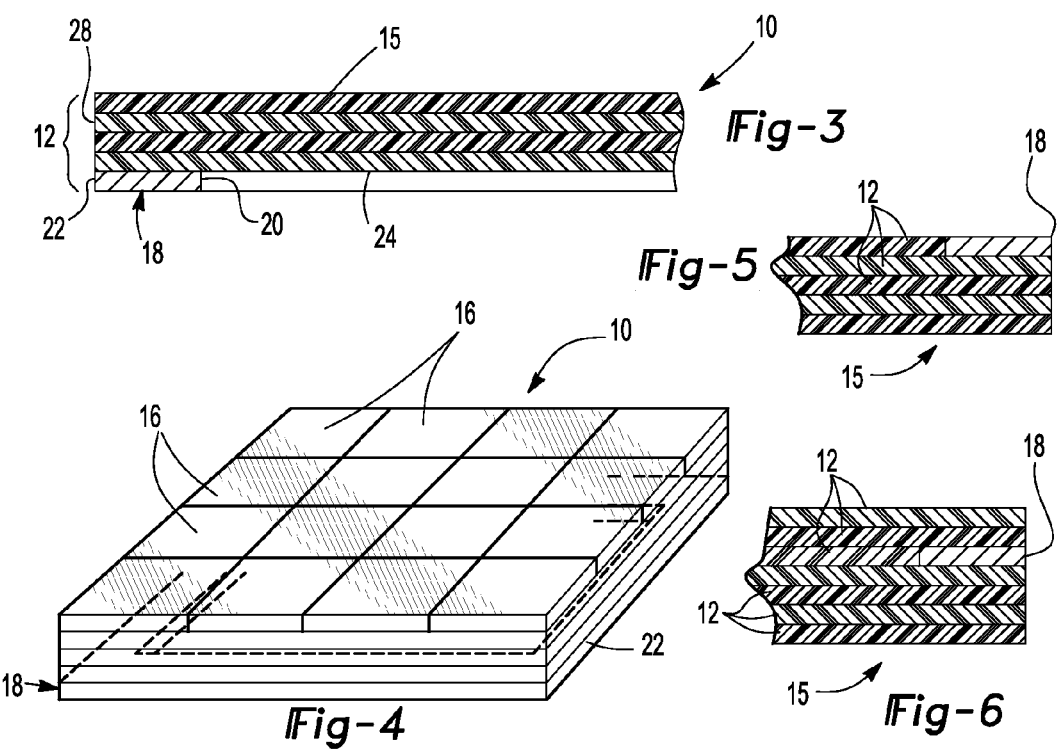

US 9,383,173 B2

TRANSPARENT ARMOR CONSTRUCTION

GOVERNMENT INTEREST

The invention described herein may be manufactured, used, and licensed by or for the United States Government.

BACKGROUND OF THE INVENTION

I. Field of the Invention

The present invention relates generally to transparent armor constructions.

II. Description of Relevant Art

Transparent armor has long been used for armored vehicles in both military and nonmilitary applications. Such transparent armor is typically used for the windows of such vehicles and thus must be transparent or at least substantially transparent.

Oftentimes, the previously known transparent armor is a laminate structure of ceramics, glasses, resins, and polymers in an asymmetric design that is sufficient to meet ballistics requirements, i.e. the ability to protect personnel from such ballistics. While these previously known laminate structures for transparent armor have functioned adequately to protect personnel from ballistics, there have been a number of previously known issues and problems associated with such transparent armor.

Perhaps of most importance, is that the previously known transparent armor suffers both degradation and failure due in large part to the residual thermal stresses that are present in such asymmetric designs when subjected to extreme temperatures. Such degradation and failure includes fractures, loss of dimensional tolerances due to bending of the transparent armor, delamination, fogging, and debonding. When this occurs, the windows must be replaced at significant cost.

A primary source of degradation and failure of the transparent armor arises from the different materials of the layers that form the laminate which have different coefficients of thermal expansion. These laminates of dissimilar materials having different coefficients of thermal expansion have effectively limited the temperature range for the transparent armor or windows before a failure may occur. For example, typically such failure occurs at temperatures of about −30° Centigrade or warmer for both lightweight transparent armor as well as transparent armor for heavy-duty vehicles. However, many vehicles, for example military vehicles, must be able to operate at temperatures below −30° Centigrade without failure.

In addition, bonding of two dissimilar materials having a high differential coefficient of thermal expansion, i.e. bonding glass to polymer, itself induces a thermal stress in the resulting laminate. These stresses can cause the premature failure from fracture, debonding, or deformation of the laminate.

In order to limit the stress caused by a high differential of the coefficient of thermal expansion between adjacent laminate layers, it has been previously known to mitigate the stresses by using compliant bonding agents as well as lower temperature processing methods to produce the laminate. However, in many circumstances, these mitigation techniques are only marginally successful. Indeed, where the laminate includes layers of both glass and ceramic/plastic, the differential coefficient of thermal expansion is still high and the processing temperatures also high that failure of the resulting laminate transparent armor is common.

SUMMARY OF THE PRESENT INVENTION

The present invention provides transparent armor which overcomes the above mentioned disadvantages of the previously known transparent armor.

In brief, the transparent armor, typically a window, of the present invention includes a laminate having at least two and more frequently many layers of planar material. These layers are constructed from different materials selected from the group of glass, ceramic, resin, polymeric material, and plastics which are all transparent or at least substantially transparent. Such materials often have different coefficients of thermal expansion.

A first bonding material, such as polyurethane or polyvinyl butyral, bonds the two layers together. Conventional bonding techniques, e.g. heating the laminate structure to a predetermined elevated temperature, typically in excess of 200° Fahrenheit, are employed to bond the laminate layers together.

Unlike the previously known transparent armor, in the present invention a planar frame having an open central portion and a continuous outer border is bonded to the laminate by conventional bonding material so that the outer edge of the border of the frame is positioned closely adjacent the outer edge of the laminate. Furthermore, the frame is preferably bonded to the laminate layer for the material having the greatest differential coefficient of thermal expansion relative to the frame.

Wide varieties of different materials may be used to form the frame. However, preferably a metal or metal alloy constructed from steel, iron, aluminum, titanium, magnesium, and/or alloys thereof is used for the material of the frame. Other types of nonmetallic material, such as fiber/polymer composite material, may alternatively be used.

In operation, the metal has a lower coefficient of thermal expansion than the laminate layer to which it is bonded. Consequently, the frame effectively limits the thermal expansion of the layer to which it is bonded and, in doing so, minimizes bending and cracking of the laminate around its edges.

The frame also serves to stiffen the overall laminate structure.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an exploded view illustrating a preferred embodiment of the present invention;

FIG. 2 is a top plan view illustrating the preferred embodiment of the present invention;

FIG. 3 is a sectional view taken substantially along line 3-3 in FIG. 2;

FIG. 4 is a view similar to FIG. 3, but illustrating a modification thereof;

FIG. 5 is a fragmentary cross-sectional view of a modification of the invention; and FIG. 6 is a fragmentary cross-sectional view of a further modification of the invention.

DETAILED DESCRIPTION OF A PREFERRED EMBODIMENT OF THE PRESENT INVENTION

With reference first to FIG. 1, a preferred embodiment of the transparent armor 10 according to the present invention is illustrated. The transparent armor 10 illustrated in the drawing is shown as a rectangular window, but the transparent armor 10 may be of any shape without deviation from the spirit or scope of the invention.

The transparent armor 10 includes a laminate structure 15 and, as such, includes a plurality of different layers 12 of material which together form the laminate structure 15. These layers of material are all transparent, or at least semi-transparent, and each layer may be constructed of any of a wide range of different transparent materials. These materials include, for example, glass, ceramic, resin, thermosetting resins such as polycarbonate, polymeric materials, plastic, and others. However, at least two of the layers 12 are constructed from different materials and each has a coefficient of thermal expansion that differs from the other.

Conventional processing is performed to bond the layers together. For example, any bonding material, such as polyurethane or polyvinyl butyral, may be disposed between adjacent layers and the entire resulting laminate structure heated to bond the layers 12 of the laminate together.

Each ply or layer of the laminate structure is not only planar but also preferably continuous across the entire transparent armor. However, as shown in FIG. 4, one or more of the layers 12 may be constructed from individual tiles 16 if desired.

Unlike the previously known transparent armor, the transparent armor 10 of the present invention includes a frame 18 having an open central portion 20 and a border 22 is bonded to either the front or back 24 (FIG. 3) or inside of the laminate structure 15. As best shown in FIGS. 2 and 3, the outer periphery 26 of the border 22 is positioned closely adjacent the outermost edge 28 of the laminate structure 15.

With reference to FIG. 5, the frame 18 may alternatively be recessed into one or more layers 28 of the laminate structure 15 so that the frame 18 is substantially flush with one end of the laminate structure 15. Similarly, the frame 18 may be positioned within the laminate as shown in FIG. 6.

Any conventional processing techniques may be utilized to attach the frame 18 to the side 24 of the laminate structure 15. However, the same bonding materials, such as polyurethane or polyvinyl butyral, preferably are utilized to bond the frame 18 to the laminate structure 15. Furthermore, the frame 18 may be bonded to the laminate structure 15 at the same time that the individual layers 12 of the laminate structure are bonded together so that the bonding of both the layers 12 to each other as well as bonding the frame 18 to the laminate structure 15 occur during the same procedure.

The frame itself is constructed of a stiff material such as steel, iron, aluminum, titanium, magnesium, other metals, and/or alloys thereof. Alternatively, the frame 18 may be constructed of S-glass, E-glass, polymers, carbon fibers, graphite, and Z-stitched composites.

The material for the frame 18 is selected so that the coefficient of thermal expansion of the frame is substantially the same as one or more layers in the laminate structure 15, but lower than the coefficient of thermal expansion of the layer 28 (FIG. 2) to which the frame 18 is bonded. Consequently, the material selection for the frame will vary as a function of the materials used for the layers 12 of the laminate structure 15.

In operation, due to the differential coefficient of thermal expansion between the frame 18 and the layer 28 to which it is bonded, the frame 18 restrains the thermal expansion of the laminate structure 15 as well as minimizes any bending of the laminate structure 15 around its edges. In practice, it has been found that the transparent armor 10 of the present invention can effectively operate in temperatures as low as −70° Centigrade without serious degradation of the structure of the transparent armor 10.

Having described our invention, many modifications thereto will become apparent to those skilled in the art to which it pertains without deviation from the spirit of the invention as defined by the scope of the appended claims.

We claim:

1. A transparent armor construction for an armored vehicle, the transparent armor construction comprising:
    an asymmetric laminate structure having at least two layers, a front surface having a first periphery, a back surface having a second periphery, and an outer edge, wherein said first and second peripheries define said outer edge between said front surface and said back surface, said at least two layers being constructed from different materials selected from the group of glass, ceramic, resin, polymeric material, and plastic, said different materials being substantially transparent and having different coefficients of thermal expansion,
    a first bonding material disposed between said at least two layers which secures said at least two layers together,
    a planar frame having an open central portion and an outer border, said frame bonded to either the front surface or the back surface of said asymmetric laminate structure by a second bonding material so that an outer periphery of said border is positioned closely adjacent said outer edge of said laminate structure, said frame selected from a material having a coefficient of thermal expansion that is substantially the same as at least one of said at least two layers and less than the coefficient of thermal expansion of a layer to which said frame is bonded, wherein said layer to which said frame is bonded is sandwiched between said frame and said at least one layer having a coefficient of thermal expansion substantially the same as said frame,
    wherein said outer periphery of said border is inside of or substantially flush with said outer edge and does not confine said outer edge of said laminate structure,
    and further wherein said asymmetric laminate structure is designed to protect occupants of said vehicle from ballistic threats and can effectively operate when subjected to temperatures below −30° Centigrade.

2. The armor construction as defined in claim 1 wherein said frame comprises a metal.

3. The armor construction as defined in claim 2 wherein said metal is selected from the group of steel, iron, aluminum, titanium, magnesium and alloys thereof.

4. The armor construction as defined in claim 1 wherein said frame comprises a fiber/polymer composite material.

5. The armor construction as defined in claim 4 wherein said fiber/polymer is selected from the group of S-glass, E-glass, carbon fiber, graphite and Z-stitched composites.

6. The armor construction as defined in claim 1 wherein at least one of said at least two layers comprises a tile structure.

7. The armor construction as defined in claim 1 wherein said first bonding material comprises polyurethane.

8. The armor construction as defined in claim 1 wherein said first bonding material comprises polyvinyl butyral.

9. The armor construction as defined in claim 1 wherein said second bonding material comprises polyurethane.

10. The armor construction as defined in claim 1 wherein said second bonding material comprises polyvinyl butyral.

11. The armor construction as defined in claim 1 wherein said frame is rectangular in shape as viewed in a direction perpendicular to said laminate.

12. The armor construction as defined in claim 1 wherein said planar frame is continuous.

13. The armor construction as defined in claim 1 wherein said asymmetric laminate structure can effectively operate when subjected to temperatures as low as −70° Centigrade.

14. A transparent armor construction comprising:
    an asymmetric laminate structure having at least two layers, a front surface having a first periphery, a back surface having a second periphery, and an outer edge, wherein said first and second peripheries define said outer edge between said front surface and said back surface, said at least two layers being constructed from different materials selected from the group of glass, ceramic, resin, polymeric material, and plastic, said different materials being substantially transparent and having different coefficients of thermal expansion, a first bonding material disposed between said at least two layers which secures said at least two layers together, a planar frame having an open central portion and an outer border, said frame bonded to either the front surface or the back surface of said asymmetric laminate structure by a second bonding material so that an outer periphery of said border is positioned closely adjacent said outer edge of said asymmetric laminate structure, said frame selected from a material having a coefficient of thermal expansion that is substantially the same as at least one of the at least two layers and less than the coefficient of thermal expansion of a layer to which said frame is bonded, wherein said layer to which said frame is bonded is sandwiched between said frame and said at least one layer having a coefficient of thermal expansion substantially the same as said frame, wherein said outer periphery of said border is inside of or substantially flush with said outer edge and does not confine said outer edge of said asymmetric laminate structure, and further wherein said asymmetric laminate structure is designed to protect from ballistic threats and can effectively operate when subjected to temperatures below −30° Centigrade.

15. The armor construction as defined in claim 14 wherein said frame comprises a metal.

16. The armor construction as defined in claim 15 wherein said metal is selected from the group of steel, iron, aluminum, titanium, magnesium and alloys thereof.

17. The armor construction as defined in claim 14 wherein said planar frame is continuous.

18. The armor construction as defined in claim 14 wherein said asymmetric laminate structure can effectively operate when subjected to temperatures as low as −70° Centigrade.

19. A transparent armor construction comprising:

an asymmetric laminate structure having at least two layers, a front surface having a first periphery, a back surface having a second periphery, and an outer edge, wherein said first and second peripheries define said outer edge between said front surface and said back surface, said at least two layers comprising a first layer constructed a materials selected from the group of glass, ceramic, and plastic and having a first coefficient of expansion, a second layer constructed a materials selected from the group of glass, ceramic, and plastic and having a second coefficient of expansion that is different than said first coefficient of thermal expansion, and said materials being substantially transparent, a first polymeric bonding material disposed between said first layer and said second layer, a planar frame having an open central portion and an outer border, said frame bonded to either the front surface or the back surface of said asymmetric laminate structure by a second polymeric bonding material so that an outer periphery of said border is positioned closely adjacent said outer edge of said asymmetric laminate structure, said frame selected from a material having a coefficient of thermal expansion that is substantially the same as at least one of the at least two layers and less than the coefficient of thermal expansion of a layer to which said frame is bonded, wherein said layer to which said frame is bonded is sandwiched between said frame and said at least one layer having a coefficient of thermal expansion substantially the same as said frame, wherein said outer periphery of said border is inside of or substantially flush with said outer edge and does not confine said outer edge of said asymmetric laminate structure.

20. The transparent armor construction as defined in claim 19 said planar frame is continuous.

21. The armor construction as defined in claim 19 wherein said asymmetric laminate structure can effectively operate when subjected to temperatures as low as −70° Centigrade.

* * * * *